United States Patent [19]

Bailor et al.

[11] 4,406,775

[45] Sep. 27, 1983

[54] CATALYST REGENERATION PROCESS

[75] Inventors: James P. Bailor, Denville; Louis S. Dauber, Cranford, both of N.J.

[73] Assignee: Exxon Research and Engineering Co., Florham Park, N.J.

[21] Appl. No.: 344,877

[22] Filed: Feb. 1, 1982

[51] Int. Cl.³ .......................................... B01J 23/90
[52] U.S. Cl. .................................... 208/140; 252/416
[58] Field of Search ......................... 208/140; 252/416

[56] References Cited

U.S. PATENT DOCUMENTS

| | | | |
|---|---|---|---|
| 2,908,653 | 10/1959 | Hengstebeck | 252/416 |
| 2,923,679 | 2/1960 | Thomson | 208/140 |
| 2,938,859 | 5/1960 | Hertwig et al. | 208/140 |
| 2,944,008 | 7/1960 | Haxton et al. | 208/140 |
| 3,046,235 | 7/1962 | King et al. | 252/411 |
| 3,898,173 | 8/1975 | Hayes | 208/140 |
| 4,148,751 | 4/1979 | Hemler et al. | 252/416 |
| 4,218,338 | 8/1980 | Huin et al. | 208/140 |

*Primary Examiner*—Curtis R. Davis
*Attorney, Agent, or Firm*—Llewellyn A. Proctor

[57] ABSTRACT

A process for regenerating, and reactivating, coked noble metal catalysts, especially platinum-containing polymetallic catalysts in a system which includes separate, interconnected primary and secondary regeneration gas circuits in which gas is circulated from one circuit to the other, (i) a primary regeneration gas circuit which contain a preheat gas furnace, a reactor which contains said catalyst from which said coke can be burned by contact with hot gas from said preheat gas furnace, and a steam boiler through which said hot gas can be passed and cooled, and the cool gas injected, or returned to said secondary circuit; and (ii) the secondary circuit is one which contains a regeneration gas scrubber, a gas drier (optional) and fines solids filter. The circuit also includes regeneration gas means, i.e. a compressor, for circulating the gas in said circuits. A gas, constituted in major part of flue gas, is passed through the preheat gas furnace, preheated, then passed into the coked catalyst-containing reactor wherein the coke is combusted by contact of a combustible mixture of the gas with the catalyst, the gas heated thereby, then cooled by passage through the steam boiler, and the cooled gas then injected into the secondary circuit. The hot flue gas, or gas within the secondary circuit, is conditioned for use as a purge gas within the primary circuit. It is countercurrently contacted with cooling water in a regeneration gas scrubber to condense out the combustion water and water desorbed from the catalyst, as well as extract the hydrogen chloride stripped from the catalyst.

13 Claims, 2 Drawing Figures

CATALYST REGENERATION PROCESS

BACKGROUND OF THE INVENTION AND PRIOR ART

Catalytic reforming, or hydroforming, is a well-established industrial process employed by the petroleum industry for improving the octane quality of naphthas or straight run gasolines. In reforming, a multi-functional catalyst is employed which contains a metal hydrogenation-dehydrogenation (hydrogen transfer) component, or components, substantially atomically dispersed upon the surface of a porous, inorganic oxide support, notably alumina. Noble metal catalysts, notably of the platinum type, are currently employed in reforming. Platinum has been widely commercially used in recent years in the production of reforming catalysts, and platinum-on-alumina catalysts have been commercially employed in refineries for the last few decades. In the last decade, additional metallic components have been added to platinum as promotors to further improve the activity or selectivity, or both, of the basic platinum catalyst, e.g., iridium, rhenium, tin, and the like. Reforming is defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of normal paraffins; isomerization of alkylcycloparaffins to yield cyclohexanes; isomerization of substituted aromatics; and hydrocracking of paraffins which produces gas, and inevitably coke, the latter being deposited on the catalyst.

In a conventional process, a series of reactors constitute the heart of the reforming unit. Each reforming reactor is generally provided with fixed beds of the catalyst which receive upflow or downflow feed, and each is provided with a heater, because the reactions which take place are endothermic. A naphtha feed, with hydrogen, or hydrogen recycle gas, is concurrently passed through a preheat furnace and reactor, and then in sequence through subsequent interstage heaters and reactors of the series. The product from the last reactor is separated into a liquid fraction, and a vaporous effluent. The latter is a gas rich in hydrogen, and usually contains small amounts of normally gaseous hydrocarbons, from which hydrogen is separated from the $C_5^+$ liquid product and recycled to the process to minimize coke production.

The activity of the catalyst gradually declines due to the buildup of coke. Coke formation is believed to result from the deposition of coke precursors such as anthracene, coronene, ovalene and other condensed ring aromatic molecules on the catalyst, these polymerizing to form coke. During operation, the temperature of the process is gradually raised to compensate for the activity loss caused by the coke deposition. Eventually, however, economics dictates the necessity of reactivating the catalyst. Consequently, in all processes of this type the catalyst must necessarily be periodically regenerated by burning the coke off the catalyst at controlled conditions, this constituting an initial phase of catalyst reactivation.

Two major types of reforming are generally practiced in the multi-reactor units, both of which necessitate periodic reactivation of the catalyst, the initial sequence of which requires regeneration, i.e., burning the coke from the catalyst. Reactivation of the catalyst is then completed in a sequence of steps wherein the agglomerated metal hydrogenation-dehydrogenation components are atomically redispersed. In the semi-regenerative process, a process of the first type, the entire unit is operated by gradually and progressively increasing the temperature to maintain the activity of the catalyst caused by the coke deposition, until finally the entire unit is shut down for regeneration, and reactivation, of the catalyst. In the second, a continuous or cyclic type of process, the reactors are individually isolated, or in effect swung out of line by various manifolding arrangements, motor operated valving and the like. The catalyst is regenerated to remove the coke deposits, and reactivated while the other reactors of the series remain on stream. A "swing reactor" temporarily replaces a reactor which is removed from the series for regeneration and reactivation of the catalyst, until it is put back in series.

There are several steps required for the regeneration, and reactivation of a catalyst. Typically, regeneration of a catalyst is accomplished in a primary and secondary coke burnoff. This is accomplished, initially, by burning the coke from the catalyst at a relatively low temperature, i.e., at about 800° F.–950° F., by the addition of a gas, usually nitrogen or flue gas, which contains about 0.6–1 mole percent oxygen. A characteristic of the primary burn is that essentially all of the oxygen is consumed, with essentially no oxygen being contained in the reactor gas outlet. Regeneration is carried out once-through, or by recycle of the gas to the unit. The temperature is gradually raised and maintained at about 950° F. until essentially all of the coke has been burned from the catalyst, and then the oxygen concentration in the gas is increased, generally to about 6 mole percent. The main purpose of the secondary burn is to insure thorough removal of coke from the catalyst within all portions of the reactor. The catalyst is then rejuvenated with chlorine and oxygen, reduced, and then sulfided. Thus, the agglomerated metal, or metals, of the catalyst, is redispersed by contacting the catalyst with a gaseous admixture containing a sufficient amount of a chloride, e.g., carbon tetrachloride, to decompose in situ and deposit about 0.1 to about 1.5 wt. % chloride on the catalyst; continuing to add a gaseous mixture containing about 6% oxygen for a period of 2 to 4 hours while maintaining temperature of about 950° F.; purging with nitrogen to remove essentially all traces of oxygen from the reactor; reducing the metals of the catalyst by contact with a hydrogen-containing gas at about 850° F.; and then sulfiding the catalyst by direct contact with, e.g., a gaseous admixture of n-butyl mercaptan in hydrogen, sufficient to deposit the desired amount of sulfur on the catalyst.

In a typical continuous, or cyclic type process, the regeneration gas is generally cooled to relatively low temperatures, i.e., about 100°–150° F., by passage through a cool waterscrubber to remove water by condensation, and the condensate drawn off. In this step, the water produced during combustion, or desorbed from the catalyst during heatup is removed from the process. The water condensate is acidic, and highly corrosive, since it contains hydrogen chloride stripped from the catalyst. The partially dried flue gas is generally further dried by passage through a dessicant bed, or beds, prior to its return to the reactor containing the catalyst being regenerated. Excessive moisture levels are intolerable since the excessive moisture produces an acidic condensate, further facilitates chloride stripping from the catalyst, and produces high hydrogen chloride levels in the vent gas sent to the atmosphere. Thus, there is a need to prevent the moisture levels in flue gas from exceeding maximum tolerable limits, as dictated by the need to suppress, if not avoid, the amount of condensate that is formed, minimize chloride stripping, and lessen vent gas hydrogen chloride concentrations.

It is, accordingly, a primary objective of the present invention to meet this need in the operation of cyclic catalyst regeneration units, especially as used in the regeneration of noble metal reforming catalysts, more particularly platinum-containing, or platinum-containing polymetallic reforming catalysts.

A specific object is to provide a novel process for the regeneration of such catalysts, at conditions which favor high cost-effectiveness and energy efficiency by recycling as purge gas a portion of the flue gas used to remove combustion water, or water desorbed from the catalyst, while suppressing corrosion; and also minimize expensive nitrogen now used as once-through purge gas.

These objects and others are achieved in accordance with the present invention, embodying improvements in a process for regenerating, and reactivating, said types of coke deactivated noble metal catalysts, in a system which includes separate, interconnected primary and secondary regeneration gas circuits in which gas is circulated from one circuit to the other, (i) the primary regeneration gas circuit containing a preheat gas furnace, a reactor which contains said catalyst from which said coke can be burned by contact with hot gas from said preheat gas furnace, and steam boiler through which said hot gas can be passed and cooled without the occurrence of condensation, and the cool gas returned to said secondary circuit, (ii) the secondary circuit containing a regeneration gas scrubber, a gas drier (optional) and particulate filter, and including regeneration gas compression means, e.g. a compressor, for circulating the gas in said circuits. A gas, constituted in major part of flue gas, is withdrawn from the secondary circuit and passed through the preheat gas furnace, preheated, then passed into the coke catalyst-containing reactor (reaction zone) wherein the coke is combusted by contact of a combustible mixture of the gas with the catalyst, the gas heated thereby, then cooled by passage through the steam boiler, and the cooled gas then returned into the secondary circuit.

The hot flue gas, or gas within the secondary circuit, is countercurrently contacted with cooling water in a regeneration gas scrubber to condense out the combustion water and water desorbed from the catalyst, as well as extract the hydrogen chloride stripped from the catalyst. The temperature of the hot flue gas is reduced to within a range of from about 60° F. to about 120° F., preferably from about 80° F. to about 105° F., and the hydrogen chloride to a concentration ranging from about 0 to about 20, preferably from about 0 to about 5, parts per million parts by volume (vppm) of total gas, while the acid condensate is removed from the bottom of the scrubber and sent to disposal. To maintain system pressure gas is purged to the atmosphere. Air and nitrogen are added to the system as purge gas. Although the combustion air carries along a significant quantity of nitrogen, a relatively small quantity of nitrogen may be needed, and added, to prevent moisture levels from exceeding maximum tolerable limits as dictated by the need to avoid condensation, minimize chloride stripping, and the amount of hydrogen chloride vented to the atmosphere. Suitably, the gas is then dried if desired, and filtered to effect particulates removal, while the gas, as purge gas, is recycled to the primary circuit for reuse in regeneration of the deactivated catalyst. The moisture level of the gas transferred to the primary circuit is maintained at a level ranging from about 0.1 percent to about 1 percent, preferably from about 0.2 percent to about 0.6 percent, based on the total volume of gas in the secondary circuit.

In its essence, the invention is one wherein the gas is conditioned in the secondary circuit for use in the primary circuit, and constitutes a source of regeneration gas, or purge gas for use in the primary circuit. The gas is withdrawn, or transferred, from the primary circuit into the secondary circuit as needed. The increasing cost of energy has caused a significant rise in the cost of inert gas and hence, the present invention sharply reduces the need for purge gas from other sources of supply.

These features and others will be better understood by reference to the following more detailed description of the invention, and to the drawings to which reference is made.

Figure 1:
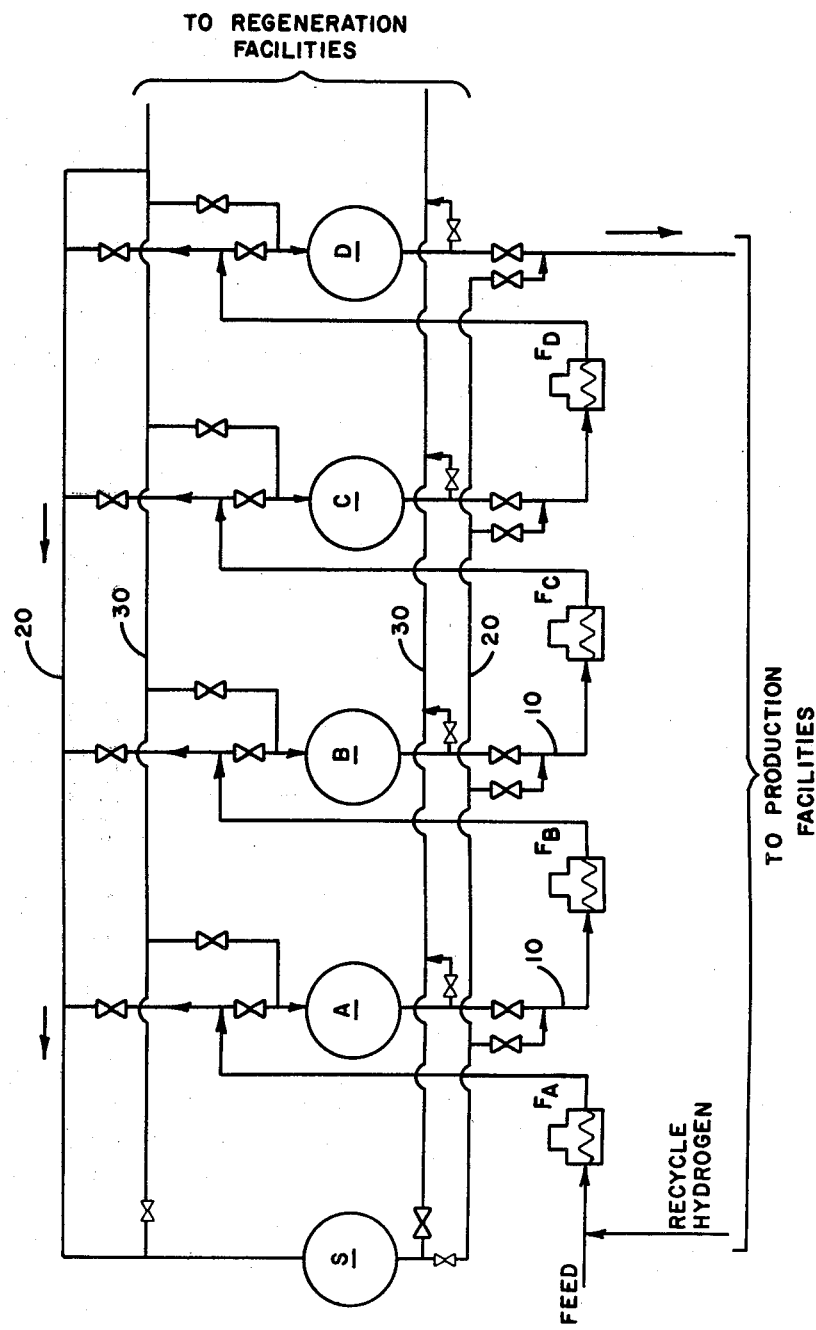
FIG. 1 depicts, by means of a simplified flow diagram, a preferred cyclic reforming unit inclusive of multiple on-stream reactors, and an alternate or swing reactor inclusive of manifolds for use with catalyst regeneration and reactivation equipment (not shown).

Referring generally to FIG. 1, there is described a cyclic unit comprised of a multi-reactor system, inclusive of on-stream Reactors A, B, C, D and a swing Reactor S, and a manifold useful with a facility for periodic regeneration and reactivation of the catalyst of any given reactor, swing Reactor S being manifolded to Reactors A, B, C, D so that it can serve as a substitute reactor for purposes of regeneration and reactivation of the catalyst of a reactor taken off-stream. The several reactors of the series A, B, C, D, are arranged so that while one reactor is off-stream for regeneration and reactivation of the catalyst, the swing Reactor S can replace it and provision is also made for regeneration and reactivation of the catalyst of the swing reactor.

In particular, the on-stream Reactors A, B, C, D, each of which is provided with a separate furnace or heater $F_A$, or reheater $F_B$, $F_C$, $F_D$, respectively, are connected in series via an arrangement of connecting process piping and valves so that feed can be passed in seriatim through $F_A A$, $F_B B$, $F_C C$, $F_D D$, respectively; or generally similar grouping wherein any of Reactors A, B, C, D are replaced by Reactor S. This arrangement of piping and valves is designated by the numeral 10. Any one of the on-stream Reactors A, B, C, D, respectively, can be substituted by swing Reactor S as when the catalyst of any one of the former requires regeneration and reactivation. This is accomplished in "paralleling" the swing reactor with the reactor to be removed from the circuit for regeneration by opening the valves on each side of a given reactor which connect to the upper and lower lines of swing header 20, and then closing off the valves in line 10 on both sides of said reactor so that fluid enters and exits from said swing Reactor S. Regeneration facilities, not shown, are manifolded to each of the several Reactors A, B, C, D, S through a parallel circuit of connecting piping and valves which form the upper and lower lines of regeneration header 30, and any one of the several reactors can be individually isolated from the other reactors of the unit and the catalyst thereof regenerated and reactivated.

In conventional practice the reactor regeneration sequence is practiced in the order which will optimize the efficiency of the catalyst based on a consideration of the amount of coke deposited on the catalyst of the different reactors during the operation. Coke deposits much more rapidly on the catalyst of Reactors C, D and S than on the catalyst of Reactors A and B and, accordingly, the catalysts of the former are regenerated and reactivated at greater frequency than the latter. The reactor regeneration sequence is characteristically in the order ACDS/BCDS, i.e., Reactors A, C, D, B, etc., respectively are substituted in order by another reactor, typically swing Reactor S, and the catalyst thereof regenerated and reactivated while the other four reactors are left on-stream.

Figure 2:
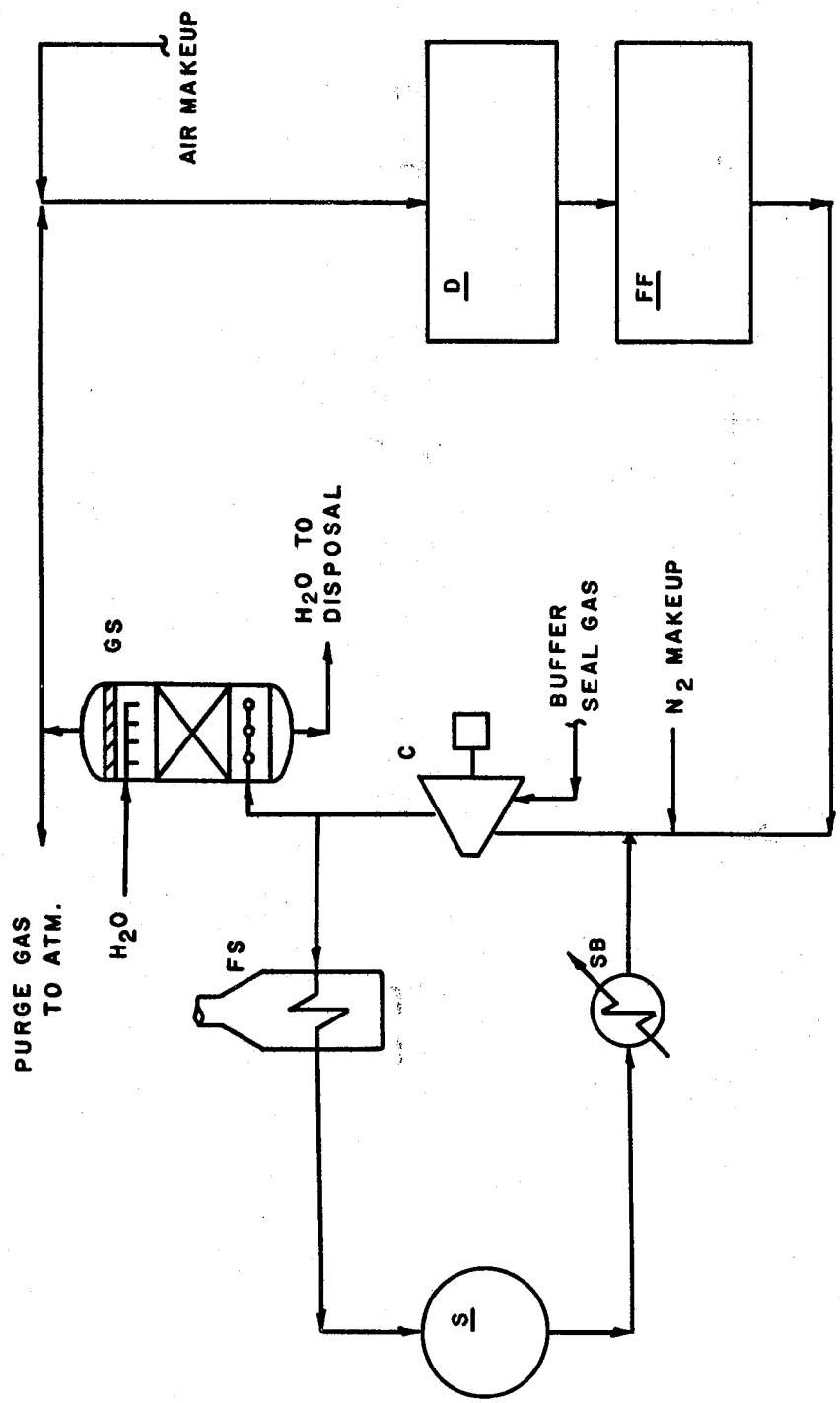
FIG. 2 depicts, in schematic fashion, for convenience, a simplified regeneration circuit.

FIG. 2 presents a simplified schematic diagram of the improved regeneration system of this invention, the Reactor S, e.g., representing a deactivated catalyst-containing reactor which has been removed from the series of on-stream reactors of the unit (Reactors A, B, C, D) for purposes of regeneration, and reactivation, of the catalyst. The regeneration system includes generally, a first, or primary recycle gas flow circuit which includes, besides the regenerating reactor, Reactor S, a regeneration furnace $F_s$ and a steam boiler SB. A secondary circuit includes a regeneration gas scrubber GS, a drier D (optional), represented by a block diagram representing dual vessel driers, inclusive of facilities for air reactivation of the driers, and a particulate filter FF. The system also includes a regeneration gas compressor C, which circulates gas in the total system.

Regeneration gas is circulated via furnace $F_s$ to Reactor S, and the gas is then cooled in steam boiler SB and returned to the suction side of compressor C. A quantity of gas for purging, as determined by the target system moisture level, is taken from the discharge of the recycle, or circulation compressor C and sent to packed scrubber GS where it is countercurrently contacted with water, the gas scrubbed to remove contaminants and water, and the water condensate then sent to disposal. The gas, which enters the scrubber GS temperature at a temperature of from about 350° F. to about 650° F., or more often from about 450° F. to about 550° F., is cooled to a temperature ranging from about 60° F. to about 120° F., preferably from about 80° F. to about 105° F., and the hydrogen chloride content of the gas, originally ranging from about 100 to about 1000 parts, more specifically from about 200 to about 700 parts, per million parts by volume (vppm), is reduced to from about 0 to about 20 vppm, or more generally from about 0 to 5 vppm. The gas leaving the scrubber overhead is hydrated, or water saturated. A small amount of the gas is vented to the atmosphere for pressure control.

The gas is prepared for recycle by drying if desired, and particulate removal. Thus, the final treatment steps for the remainder of the gas are drying via passage of the gas through driers D (optional), and the removal of particulates via passage through the particulate filter FF. The gas driers per se are conventional, and may be dual-vessel alumina driers, generally arranged in parallel for alternate use, with simple reactivation facilities, such as once-through, steam heated air for heatup and cool, dry air (e.g., instrument air) for cooldown. The gas stream is then returned to the suction of the recycle compressor under flow control. Due to the extraordinary cleanliness requirements for the compressor a buffer seal gas is employed, and a separate clean nitrogen makeup and air makeup streams are injected into the secondary circuit. Flue gas, as purge gas, is withdrawn from the secondary circuit and passed into the primary circuit wherein the moisture level is maintained below about 4 percent, perferably below about 2 percent, based on the total volume of gas in said primary circuit.

The invention will be more fully understood by reference to the following nonlimiting example.

EXAMPLE

In a catalyst regeneration system, such as is specifically described by reference to FIG. 2, a coked, deactivated platinum catalyst is regenerated by burning the coke from the catalyst as described for a typical operation. The secondary circuit includes a particulates filter, in addition to a compressor and regeneration gas scrubber; and the primary circuit includes a regeneration gas furnace, regenerating reactor, and steam boiler. With air and nitrogen added to the system, the system is balanced in terms of flow rates per thousand SCF/hour as given in the Table.

TABLE

| Flow Rate of Gas SCF/Hr | Section of System Referenced |
|---|---|
| 5,288 | to Regeneration Furnace, $F_s$ |
| 5,288 | to Reactor S |
| 5,292 | to Steam Boiler, SB |
| 5,829 | to Inlet of Compressor, C |
| 573 | to Regeneration Gas Scrubber, GS |
| 266 | to Purge Gas to Atmosphere |
| 299 | Downstream of Regeneration Gas Scrubber, GS |
| 238 | Air Makeup |
| 537 | to Particulate Filter |

Pursuant to these conditions the moisture level within the primary circuit is maintained below 2 vol. % water, and the hydrogen chloride level is about 500 ppm.

The catalysts employed in accordance with this invention are constituted of composite particles which contain, besides a carrier of support material, a noble metal hydrogenation-dehydrogenation component, or components, a halide component and, preferably, the catalyst is sulfided. The catalyst contains a Group VIII noble metal, or platinum group metal (ruthenium, rhodium, palladium, osmium, iridium and platinum); and suitably an additional metal or metals component, e.g., rhenium, iridium, tin, germanium, tungsten, or the like. The support material is constituted of a porous, refractory inorganic oxide, particularly alumina. The support can contain, e.g., one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 $m^2/g$, preferably from about 100 to about 300 $m^2/g$, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300° A.

The metal hydrogenation-dehydrogenation component can be composited with or otherwise intimately associated with the porous inorganic oxide support or carrier by various techniques known to the art such as ion-exchange, coprecipitation with the alumina in the sol or gel form, and the like. For example, the catalyst composite can be formed by adding together suitable reagents such as a salt of platinum and ammonium hydroxide or carbonate, and a salt of aluminum such as aluminum chloride or aluminum sulfate to form aluminum hydroxide. The aluminum hydroxide containing the salts of platinum can then be heated, dried, formed into pellets or extruded, and then calcined in nitrogen or other non-agglomerating atmosphere. The metal hydrogenation components can also be added to the catalyst by impregnation, typically via an "incipient wetness" technique which requires a minimum of solution so that the total solution is absorbed, initially or after some evaporation.

It is preferred to deposit the platinum and additional metals used as promoters, if any, on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

Platinum in absolute amount, is usually supported on the carrier within the range of from about 0.01 to 3 percent, preferably from about 0.05 to 1 percent, based on the weight of the catalyst (dry basis). The absolute concentration of the metal, of course, is preselected to provide the desired catalyst for each respective reactor of the unit. In compositing the metal, or metals, with the carrier, essentially any soluble compound can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. Where, e.g., platinum is to be deposited on the carrier, platinum chloride, platinum nitrate, chloroplatinic acid, ammonium chloroplatinate, potassium chloroplatinate, platinum polyamine, platinum acetylacetonate, and the like, are preferably used. A promoter metal, when employed, is added in concentration ranging from about 0.1 to 3 percent, preferably from about 0.05 to about 1 percent, based on the weight of the catalyst.

To enhance catalyst performance in reforming operations, it is also required to add a halogen component to the catalysts, fluorine and chlorine being preferred halogen components. The halogen is contained on the catalyst within the range of 0.1 to 3 percent, preferably within the range of about 1 to about 1.5 percent, based on the weight of the catalyst. When using chlorine has a halogen component, it is added to the catalyst within the range of about 0.2 to 2 percent, preferably within the range of about 1 to 1.5 percent, based on the weight of the catalyst. The introduction of halogen into catalyst can be carried out by any method at any time. It can be added to the catalyst during catalyst preparation, for example, prior to, following or simultaneously with the incorporation of the metal hydrogenation-dehydrogenation component, or components. It can also be introduced by contacting a carrier material in a vapor phase or liquid phase with a halogen compound such as hydrogen fluoride, hydrogen chloride, ammonium chloride, or the like.

The catalyst is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1000° F., either in the presence of oxygen in an air stream or in the presence of an inert gas such as nitrogen.

Sulfur is a highly preferred component of the catalysts, the sulfur content of the catalyst generally ranging to about 0.2 percent, preferably from about 0.02 percent to about 0.15 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F. and at pressures ranging from about 1 to about 40 atmospheres for the time necessary to achieve breakthrough, or the desired sulfur level.

An isolated reactor which contains a bed of such catalyst, the latter having reached an objectionable degree of deactivation due to coke deposition thereon, is first purged of hydrocarbon vapors with a nonreactive or inert gas, e.g., helium, nitrogen, or flue gas. The coke or carbonaceous deposits are then burned from the catalyst in a primary burn by contact with an oxygen-containing gas, particularly one rich in both oxygen and $CO_2$, at controlled temperature below about 1100° F., and preferably below about 1000° F. Since a major amount of the $CO_2$ formed during combustion will not be removed in the purge, or vent gas cleanup system at the scrubber, its concentration will be increased to advantage; since $CO_2$ has a higher heat capacity (on a weight basis) than nitrogen, this permitting greater air injection rates and faster burns. The temperature of the burn is controlled by controlling the oxygen concentration and inlet gas temperature, this taking into consideration, of course, the amount of coke to be burned and the time desired in order to complete the burn. Typically, the catalyst is initially treated with an oxygen/nitrogen gas having an oxygen partial pressure of at least about 0.1 psi (pounds per square inch), and preferably in the range of about 0.2 psi to about 5 psi to provide a temperature of no more than about 950° F. to about 1000° F., for a time sufficient to remove the coke deposits. Coke burn-off is thus accomplished by first introducing only enough oxygen to initiate the burn while maintaining a relatively low temperature, and then gradually increasing the temperature as the flame front is advanced by additional oxygen injection until the temperature has reached optimum. Suitably, the oxygen is increased within the mixture to about 6 volume percent and the temperature gradually elevated to about 950° F.

Typically in reactivating multimetallic catalysts, sequential halogenation and hydrogen reduction treatments are required to reactivate the reforming catalysts to their original state of activity, or activity approaching that of fresh catalyst after coke or carbonaceous deposits have been removed from the catalyst. The agglomerated metals of the catalyst are first redispersed and the catalyst reactivated by contact of the catalyst with halogen, suitably a halogen gas or a substance which will decompose in situ to generate halogen. Various procedures are available dependent to a large extent on the nature of the catalyst employed. Typically, e.g., in the reactivation of a platinum-rhenium catalyst, the halogenation step is carried out by injecting halogen, e.g., chlorine, bromine, fluorine or iodine, or a halogen component which will decompose in situ and liberate halogen, e.g., carbon tetrachloride, in the desired quantities, into the reaction zone. The gas is generally introduced as halogen, or halogen-containing gaseous mixture, into the reforming zone and into contact with the catalyst at temperature ranging from about 550° F. to about 1150° F., and preferably from about 700° F. to about 1000° F. The introduction may be continued up to the point of halogen breakthrough, or point in time when halogen is emitted from the bed downstream of the location of entry where the halogen gas is introduced. The concentration of halogen is not critical, and can range, e.g., from a few parts per million (ppm) to essentially pure halogen gas. Suitably, the halogen, e.g., chlorine, is introduced in a gaseous mixture wherein the halogen is contained in concentration ranging from about 0.01 mole percent to about 10 mole percent, and preferably from about 0.1 mole percent to about 3 mole percent.

After redispersing the metals with the halogen treatment, the catalyst may then be rejuvenated by soaking in an admixture of air which contains about 6 to 20 volume percent oxygen, at temperatures ranging from about 850° F. to about 950° F.

Oxygen is then purged from the reaction zone by introduction of a nonreactive or inert gas, e.g., nitrogen, helium or flue gas, to eliminate the hazard of a chance explosive combination of hydrogen and oxygen. A reducing gas, preferably hydrogen or a hydrogen-containing gas generated in situ or ex situ, is then introduced into the reaction zone and contacted with the catalyst at temperatures ranging from about 400° F. to about 1100° F., and preferably from about 650° F. to about 950° F., to effect reduction of the metal hydrogenation-dehydrogenation components, contained on the catalysts. Pressures are not critical, but typically range between about 5 psig to about 300 psig. Suitably, the gas employed comprises from about 0.5 to about 50 percent hydrogen, with the balance of the gas being substantially nonreactive or inert. Pure, or essentially pure, hydrogen is, of course, suitable but is quite expensive and therefore need not be used. The concentration of the hydrogen in the treating gas and the necessary duration of such treatment, and temperature of treatment, are interrelated, but generally the time of treating the catalyst with a gaseous mixture such as described ranges from about 0.1 hour to about 48 hours, and preferably from about 0.5 hour to about 24 hours, at the more preferred temperatures.

The catalyst of a reactor may be presulfided, prior to return of the reactor to service. Suitably a carrier gas, e.g., nitrogen, hydrogen, or admixture thereof, containing from about 500 to about 2000 ppm of hydrogen sulfide, or compound, e.g., a mercaptan, which will decompose in situ to form hydrogen sulfide, at from about 700° F. to about 950° F., is contacted with the catalyst for a time sufficient to incorporate the desired amount of sulfur upon the catalyst.

It is apparent that various modifications and changes can be made without departing from the spirit and scope of the present invention.

Having described the invention, what is claimed is:

1. In a process for reforming, with hydrogen, a naphtha feed which is contacted at reforming conditions in a reforming unit constituted a plurality of on-stream reactors connected in series, each of which contains a noble metal catalyst which is deactivated by coke which is deposited on the catalyst such that each reactor must be periodically isolated from the other on-stream reactors of the series and the catalyst thereof regenerated by burning the coke from the catalyst at controlled conditions, this constituting an initial phase of catalyst reactivation, the improvement comprising establishing a gas regeneration system which includes separate, interconnected primary and secondary regeneration gas circuits in which gas is circulated from one circuit to another, (i) the primary regeneration gas circuit containing, in series, a preheat gas furnace, the isolated reactor which contains said deactivated, coked catalyst, and a steam boiler, (ii) the secondary circuit containing a regeneration gas scrubber, and regeneration gas compression means for circulating the gas in the circuits, withdrawing gas from said secondary circuit and passing said gas through the preheat gas furnace to preheat the gas, passing the preheated gas to the isolated reactor and contacting said preheated gas with said catalyst to burn the coke from the catalyst, passing the flue gas from the coke burn through the steam boiler, cooling the flue gas without the occurrence of condensation, and then passing cooled flue gas into the secondary circuit, countercurrently contacting the flue gas within the secondary circuit with cooling water to condense out the combustion water, and water desorbed from the catalyst, and scrub out the hydrogen chloride, while reducing the temperature of the flue gas, drawing off the condensate from the scrubber, and injecting makeup gas into said gas regeneration system to prevent moisture levels from exceeding an amount which would produce corrosion within the system.

2. The process of claim 1 wherein the temperature of the flue gas countercurrently contacted with water in the secondary circuit is reduced to within a range of from about 60° F. to about 120° F.

3. The process of claim 2 wherein the temperature of the flue gas is reduced to within a range of from about 80° F. to about 105° F.

4. The process of claim 1 wherein the hydrogen chloride concentration of the flue gas countercurrently contacted with water in the secondary circuit is reduced to within a range of from 0 vppm to about 20 vppm.

5. The process of claim 4 wherein the hydrogen chloride concentration is reduced to within a range of from 0 vppm to about 5 vppm.

6. The process of claim 1 wherein the makeup gas injected into the system which is added to the secondary circuit as a purge gas.

7. The process of claim 1 wherein the makeup gas injected into the system are both air which are added to the secondary circuit as purge gas.

8. The process of claim 1 wherein the secondary circuit also contains a drier downstream of the water contacting and scrubbing step.

9. The process of claim 1 wherein a particulate filter is located in secondary circuit downstream of the water contacting and scrubbing step.

10. The process of claim 1 wherein the moisture level of the gas transferred to the primary circuit ranges from about 0.1 to about 1 percent, based on the total volume of gas in the secondary circuit.

11. The process of claim 10 wherein the moisture level ranges from about 0.2 to about 0.6 percent.

12. The process of claim 1 wherein the moisture level within the primary circuit does not exceed about 4 percent, based on the total volume of gas in the primary circuit.

13. The process of claim 12 wherein the moisture level does not exceed about 2 percent.

* * * * *